United States Patent
Maltseff et al.

(10) Patent No.: US 8,507,834 B2
(45) Date of Patent: Aug. 13, 2013

(54) SYSTEM AND METHOD FOR AUTOFOCUSING AN OPTICAL SYSTEM THROUGH IMAGE SPECTRAL ANALYSIS

(75) Inventors: Paul A. Maltseff, Woodinville, WA (US); Jean-Louis Massieu, Montauban (FR); Ronald D. Payne, Bothell, WA (US)

(73) Assignee: Intermec IP Corp., Everett, WA (US)

( * ) Notice: Subject to any disclaimer, the term of this patent is extended or adjusted under 35 U.S.C. 154(b) by 749 days.

(21) Appl. No.: 12/694,161

(22) Filed: Jan. 26, 2010

(65) Prior Publication Data
US 2010/0200727 A1   Aug. 12, 2010

Related U.S. Application Data

(60) Provisional application No. 61/151,446, filed on Feb. 10, 2009.

(51) Int. Cl.
*G02B 27/64* (2006.01)
(52) U.S. Cl.
USPC ............. 250/201.2; 250/201.4; 348/345; 348/346; 356/4.04; 356/4.05; 356/609; 356/624
(58) Field of Classification Search
USPC ............. 250/201.2, 201.4; 348/345, 346; 356/4.04, 4.05, 609, 624
See application file for complete search history.

(56) References Cited

U.S. PATENT DOCUMENTS

| | | | |
|---|---|---|---|
| 2,522,267 A | 9/1950 | Hardin | |
| 5,231,443 A | 7/1993 | Subbarao | |
| 5,359,185 A | 10/1994 | Hanson | |
| 8,248,515 B2* | 8/2012 | Ng et al. | 348/343 |
| 2001/0015763 A1* | 8/2001 | Miwa et al. | 348/345 |
| 2004/0125228 A1* | 7/2004 | Dougherty | 348/345 |
| 2010/0188558 A1* | 7/2010 | Gamadia et al. | 348/345 |

FOREIGN PATENT DOCUMENTS
WO   WO 2005091067 A2 *   9/2005

OTHER PUBLICATIONS

Aslantas, V., "A Depth Estimation Algorithm with a Single Image," Optics Express, vol. 15, No. 8, Apr. 16, 2007, 6 pages.
Elisei et al. "Implementation of Multiaxial Doppler Sodar System with Advanced Data Processing," Atmospheric Research, 20, 1986, pp. 109-118.
Pentland, Alex Paul, "A New Sense for Depth of Field," IEEE Transactions on Pattern Analysis and Machine Intelligence, vol. PAMI-9, No. 4., Jul. 1989, 9 pages.
Poujouly et al. "Digital laser range finder: phase-shift estimation by undersampling technique," Industrial Electronics Society, vol. 3, pp. 1312-1317, 1999.

* cited by examiner

*Primary Examiner* — Georgia Y Epps
*Assistant Examiner* — Kevin Wyatt
(74) *Attorney, Agent, or Firm* — Perkins Coie LLP (57) ABSTRACT

A system and method of autofocusing an optical system uses transforms of images or portions of images formed by the optical system. A detector is used to capture images at different positions relative to the optical system. Transforms and blur spread parameters are calculated for the images for use in determining a position to which the detector should be moved to autofocus the system.

18 Claims, 11 Drawing Sheets

SYSTEM AND METHOD FOR AUTOFOCUSING AN OPTICAL SYSTEM THROUGH IMAGE SPECTRAL ANALYSIS

CROSS REFERENCE

This application claims the benefit of U.S. Provisional Application No. 61/151,446, entitled "SYSTEM AND METHOD FOR AUTOFOCUSING AN OPTICAL SYSTEM THROUGH IMAGE SPECTRAL ANALYSIS," filed Feb. 10, 2009, and is hereby incorporated by reference.

BACKGROUND

There are many methods based upon image analysis for identifying the optimum imaging location for an optical system. The most commonly used method involves a statistical analysis of a particular part of the image. Three sequential images are acquired, and their histograms analyzed, in order to determine the direction of movement of the lens to achieve a focused image. However, there are problems associated with statistical analysis methods, for example, these methods are multi-step procedures and therefore require substantial computational resources. Further, such methods can be time consuming.

There is a need for a system that overcomes the above problems, as well as providing additional benefits. Overall, the above examples of some related systems and associated limitations are intended to be illustrative and not exclusive. Other limitations of existing or prior systems will become apparent to those of skill in the art upon reading the following Detailed Description.

DETAILED DESCRIPTION

Autofocus is a feature of an optical system where a correct focus is obtained and continuously maintained on an object of interest without the intervention of a user to manually adjust the focus. A method of autofocusing an optical system based upon a spectral analysis of the image is described below. The imaging plane of the optical system is coupled to a movable platform, and the platform is controlled by a processor that calculates transforms of images at different imager locations to determine the best focused image position. A lookup table may be used to speed the autofocusing process.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
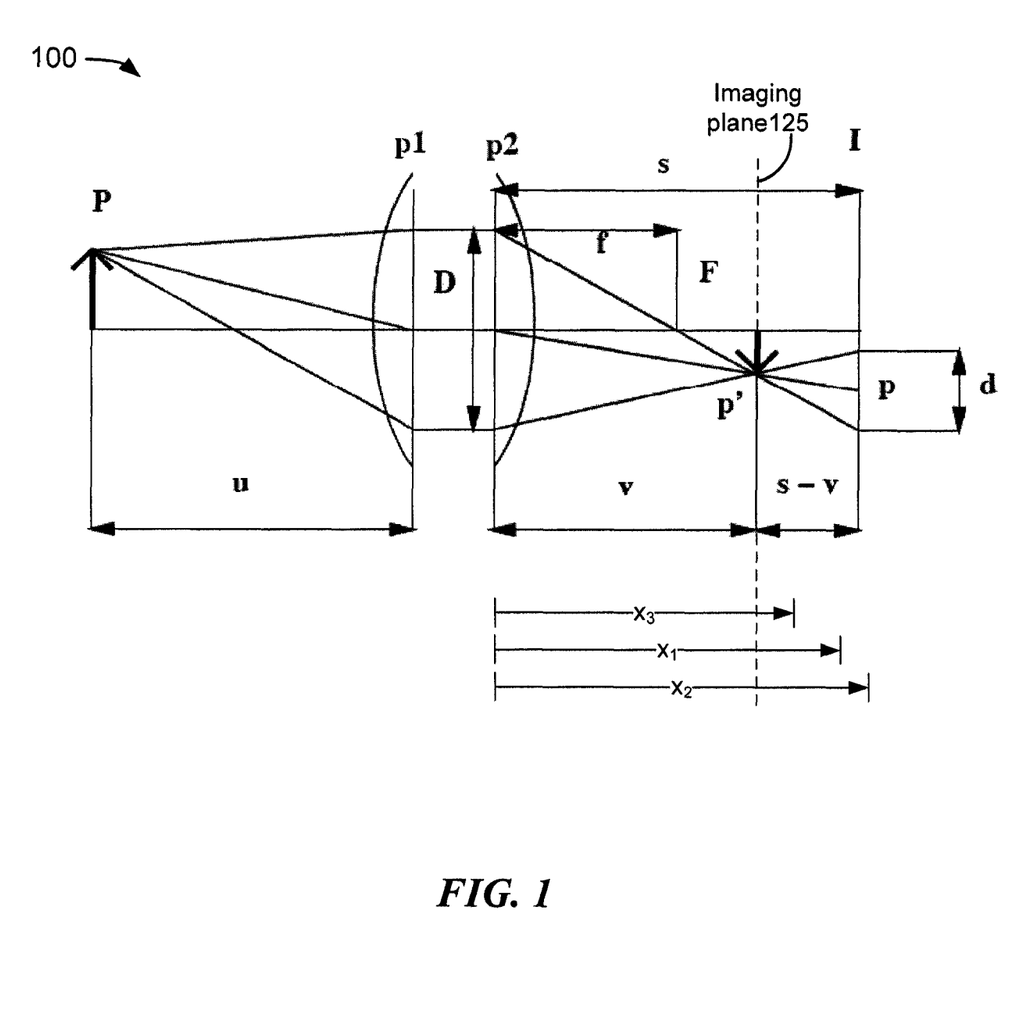
FIG. 1 illustrates an example optical imaging system.

FIG. 1 shows an example of an optical system 100 with two principal planes used to image an object P. The optical system can of course be more complex than the schematic optical system shown in FIG. 1. In the example of FIG. 1, P is the object point; p' is the image point; p1 is the first principal plane; p2 is the second principal plane; I is the image plane; p is an image on the image plane I; f is the focal length; s is the distance between the imaging plane I and the second principal plane p2; u is the distance between the object and the first principal plane p1; v is the distance between the second principal plane p2 and the focused image point p'; d is the diameter of the blur circle; and D is the diameter of the lens aperture.

The image formation of a point P on a plane at the focused image point p' is described by the well-known lens formula, $$\frac{1}{f} = \frac{1}{u} + \frac{1}{v}. \tag{1}$$

Additionally, the diameter of the blur circle can be defined from the geometrical relationships depicted in FIG. 1 as $$d = Ds\left(\frac{1}{f} - \frac{1}{u} - \frac{1}{s}\right). \tag{2}$$

Thus, if the imaging plane I is located a distance v from the second principal plane p2, the image p' will be in focus. If the imaging plane I is moved, either farther or closer, to the principal plane p2, the image will become defocused. An autofocusing system attempts to place an imager at an imaging plane where the object is in focus without help from an operator.

The distances $x_1$, $x_2$, and $x_3$ shown near the bottom of FIG. 1 show example positions for the imaging plane at which the image is defocused. As the imaging plane moves farther away from both the position where the image p' is focused (referred to as imaging plane 125) and the optical system, from position $x_3$ to $x_1$, then to $x_2$, the image becomes more defocused. Similarly, if the imaging plane were to move in the opposite direction, that is, farther away from the position where the image p' is focused (imaging plane 125), but closer to the optical system, the image would also become more and more defocused.

Figure 2:
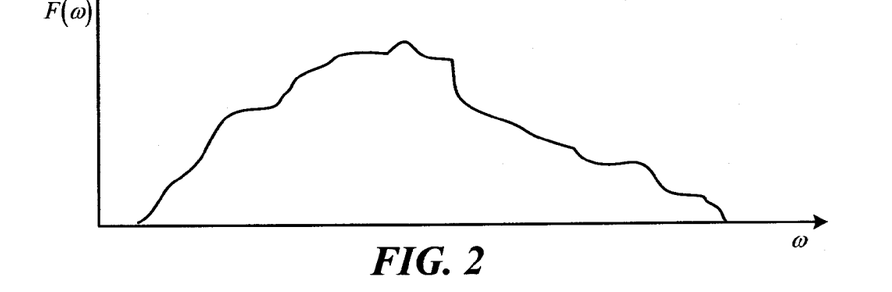
FIG. 2 shows an example frequency-dependent curve obtained from taking a transform of an image.

The autofocusing technique disclosed herein includes applying a selected transform to an image and evaluating relative changes in the diameter of the blur circle for different imager positions. Any type of transform can be used that transforms a function to the spatial frequency domain. Non-limiting examples of suitable transform functions include the Fourier transform, Laplace transform, and Wavelet transform. The transform function acts upon the values of the pixels making up a two-dimensional image, resulting in a frequency-dependent function that can be represented by a two-dimensional curve, as shown, for example, in FIG. 2. The frequency-dependent function provides information about the spatial frequency content of the image. Different spatial frequencies convey different information about features of the image. High spatial frequencies represent abrupt spatial changes, such as edges and fine details. Low spatial frequencies represent more global information about the shape, such as general orientation and proportions. A focused image will have sharper features and edges, while a defocused image will have fuzzier features and edges. Consequently, the focused image contains higher frequency components than a defocused image. Because defocusing can occur as the imaging plane is moved away from the focused position, both toward the optical system and away from the optical system, defocused images obtained on either side of the imaging plane 125 will have lower spatial frequency content than the focused image at the imaging plane 125.

Figure 3A:
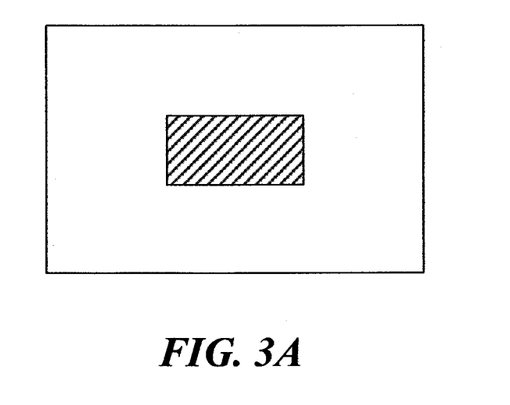
FIGS. 3A-3C show examples of different sub-sections of images that can be used with the spectral analysis method of autofocusing.
Figure 3B:
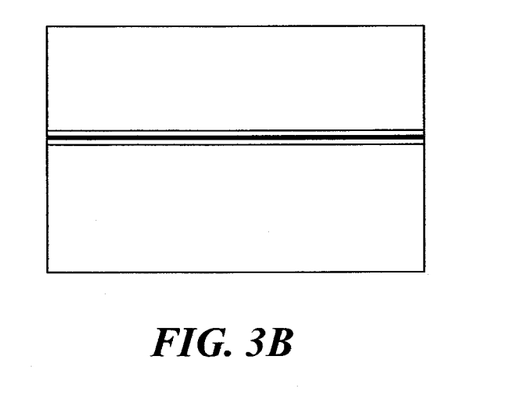
Figure 3C:
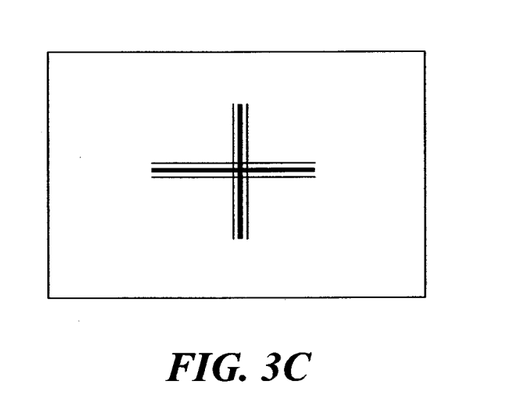

Although a transform can be taken of an entire image, it is less computationally intensive and time-consuming to take a transform of just a selected section of the image. The selected section of the image can vary from application to application, however representative frequencies of the entire image should be present in the selected section. A few non-limiting examples of suitable sections of images or portions of images from a digital image that can be used are shown in FIG. 3. Each of the images in FIG. 3 has a rectangular outline as is typical for photographic images, CCD (charge-coupled device) images, or images obtained from various digital image capture components. However, the actual shape of the outline of the image is not important and can be dependent on alternative or additional factors besides makeup of the imager.

Typically, when a user takes a photograph with a camera (e.g. digital camera), the subject and interesting features will tend to be located in the center portion of the image, as shown by the shaded portion of FIG. 3A. Thus, the center portion of the image would include representative spatial frequencies of the entire image. In a few other examples, a narrow strip of pixels across the image (for example, a three-pixel wide shaded portion of FIG. 3B) or a cross-shaped portion near the center of image (for example, the shaded portion of FIG. 3C) can also be used if the section of the image captures representative spatial frequency components in the image.

Figure 4A:
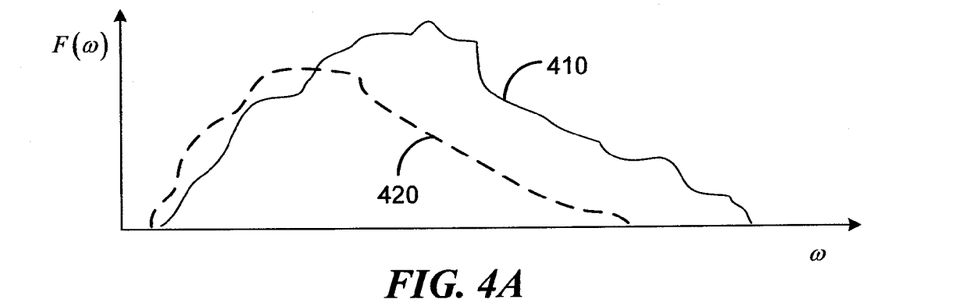
FIGS. 4A-4C show example graphs of transform curves for an optical system.

Graphs of examples of the frequency-dependent transform of an image or portion of an image are shown in FIG. 4A for two different imaging plane positions. Curve 410 shows the transform of the image when the imager is positioned at the focused imaging plane 125 shown in FIG. 1. Curve 420 shows the transform of a defocused image when the imager is moved away from the optical system to position $x_1$ shown in FIG. 1. Notice that the frequency spectrum shown in curve 420 has shifted towards lower frequencies and that the spectrum has a lower average frequency than that of curve 410.

Figure 4B:
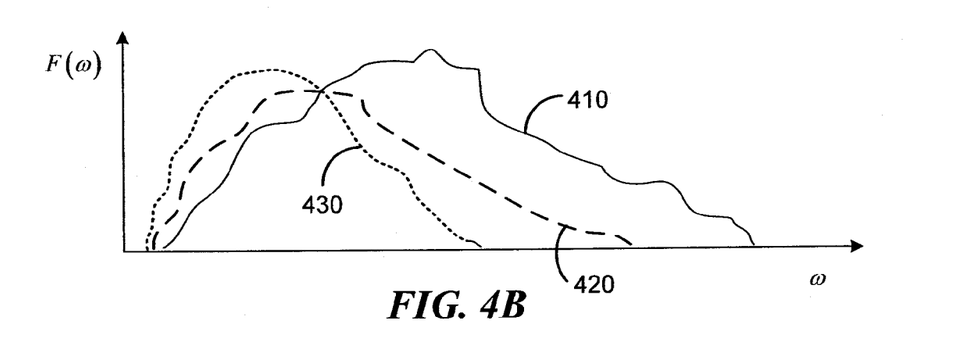

The graph in FIG. 4B compares the transform curves in FIG. 4A with the transform curve for the image when the image plane is located at the position $x_2$ shown in FIG. 1. The position $x_2$ is farther from the imaging plane 125 than position $x_1$. Thus, it is expected that the image at position $x_2$ will be more defocused. Curve 430 is the transform function corresponding to the position $x_2$, where the frequency spectrum has shifted even farther towards lower frequencies and has an even lower average frequency than that of curve 420.

Figure 4C:
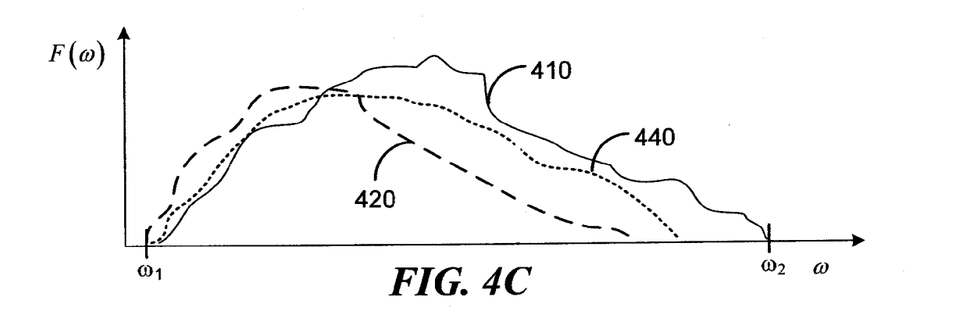

The graph in FIG. 4C compares the transform curves in FIG. 4A with the transform curve for the image taken when the image plane is located at the position $x_3$ shown in FIG. 1. The position $x_3$ is closer to the optical system and the imaging plane 125 than position $x_1$. Consequently, the image at position $x_3$ will be more focused than the image at position $x_1$. Curve 440 is the transform function corresponding to the position $x_3$, where the frequency spectrum has shifted towards higher frequencies but not as high as the spatial frequency content of curve 410. The analysis below will describe how the amount of defocus of an image can be quantified by using a blur value derivable from the transforms of the images.

An object point is imaged to a blurred circle when the image is defocused, and the blur can be approximated with a Gaussian profile such as $$h(x, y) = \frac{1}{2\pi\sigma^2} \exp\left(-\frac{x^2 + y^2}{2\sigma^2}\right), \tag{3}$$

where σ is a blur spread parameter that is defined as $$\sigma = kd, \tag{4}$$

and k is a constant coefficient pertaining to a particular optical system that can be calculated during the calibration of the system. Equation (3) is known as the Point Spread Function (PSF).

The PSF is rarely perfectly Gaussian, but independent of the exact form of the PSF, the PSF still has a local minimum at the best focus position and is a continuous and monotonically increasing function as we move away from the best focus position.

Since a radial cross-section through the Airy pattern of a point light source located at P and passing through the aperture D could also be approximated with a Gaussian profile (by ignoring the substantially smaller outer rings of the Airy pattern), the blur spread diameter a can be approximated on a plane containing p' as $$\sigma \approx 0.44\lambda/D. \tag{5}$$

The formation of the image of the point P on imaging plane I can be described as a convolution of the PSF, h(x,y), with p', the focused image of P, $$g(x,y) = h(x,y) * i(x,y), \tag{6}$$

where i(x,y) is the focused image p'.

If we assume that we acquired two images $g_1(x,y)$ and $g_2(x,y)$ of the same scene at two different focal length settings $f_1$ and $f_2$, where $f_2 = f_1 + \Delta f$, and $f_1$ and $f_2$ give rise to two different blur spread values $\sigma_1$ and $\sigma_2$, respectively, with a point spread function h(x, y), then $$g_1(x,y) = h_1(x,y) * i(x,y) \text{ and } g_2(x,y) = h_2(x,y) * i(x,y). \tag{7}$$

Although any type of transform can be used that transforms a spatial function to the spatial frequency domain, the example of a Fourier transform will be used to simplify the discussion. Because a Fourier transform of a convolution of two functions is equal to the product of the two functions in the frequency domain, we obtain $$G_1(n,m) = H_1(n,m)I(n,m), \text{ and } G_2(n,m) = H_2(n,m)I(n,m) \tag{8}$$

where $G_1(n,m)$, $G_2(n,m)$, $H_1(n,m)$, $H_2(n,m)$, and $I(n,m)$ are Fourier transforms of the functions $g_1(x,y)$ $g_2(x,y)$, $h_1(x,y)$, $h_2(x,y)$, and $i(x,y)$, respectively.

Direct and inverse Fourier transforms of a continuous function $f(x,y)$ are as follows, $$F(n, m) = \int\int_{-\infty}^{\infty} f(x, y)\exp(-j2\pi(nx + my))dxdy, \quad (9)$$

$$f(x, y) = \int\int_{-\infty}^{\infty} F(n, m)\exp(j2\pi(nx, my))dndm. \quad (10)$$

Thus, the inverse transform in equation (10) represents the spatial function $f(x,y)$ as a linear combination of complex exponentials $\exp(j2\pi(nx,my))$ with complex weights $F(n,m)$.

The Fourier transform in equation (9) for a light variation of the blur circle (3) is given by $$H(n, m) = \exp\left(-\frac{1}{2}(n^2 + m^2)\sigma^2\right).$$

Therefore, the ratio $$G^r = \frac{G_1(n, m)}{G_2(n, m)}$$

can be represented as $$G^r = \frac{H_1(n, m)I(n, m)}{H_2(n, m)I(n, m)} \quad (11)$$
$$= \frac{H_1(n, m)}{H_2(n, m)}$$
$$= \frac{\exp\left(-\frac{1}{2}(n^2 + m^2)\sigma_1^2\right)}{\exp\left(-\frac{1}{2}(n^2 + m^2)\sigma_2^2\right)}$$
$$= \exp\left(-\frac{1}{2}(n^2 + m^2)(\sigma_1^2 - \sigma_2^2)\right).$$

Using equation (11), we can express the difference of squared blur spread values for two different focal lengths $f_1$ and $f_2 = f_1 + \Delta f$ as $$\sigma_1^2 - \sigma_2^2 = -\frac{2}{n^2 + m^2}\ln G^r. \quad (12)$$

Then the ratio $$\rho_f = \frac{\sigma_1^2 - \sigma_2^2}{\Delta f} \quad (13)$$

provides a qualitative measure for an adjustment of the focal distance of a camera in order to decrease the blur of the next acquired image in an autofocusing procedure.

Furthermore, instead of changing the focal length f, we could change s, the distance between the image plane and the second principal plane p2. For example, let $s_1$ and $s_2 = s_1 + \Delta s$ be two different settings, then we would obtain the qualitative measure $$\rho_s = \frac{\sigma_1^2 - \sigma_2^2}{\Delta s} \quad (14)$$

that can be used in an autofocusing procedure.

Figure 5A:
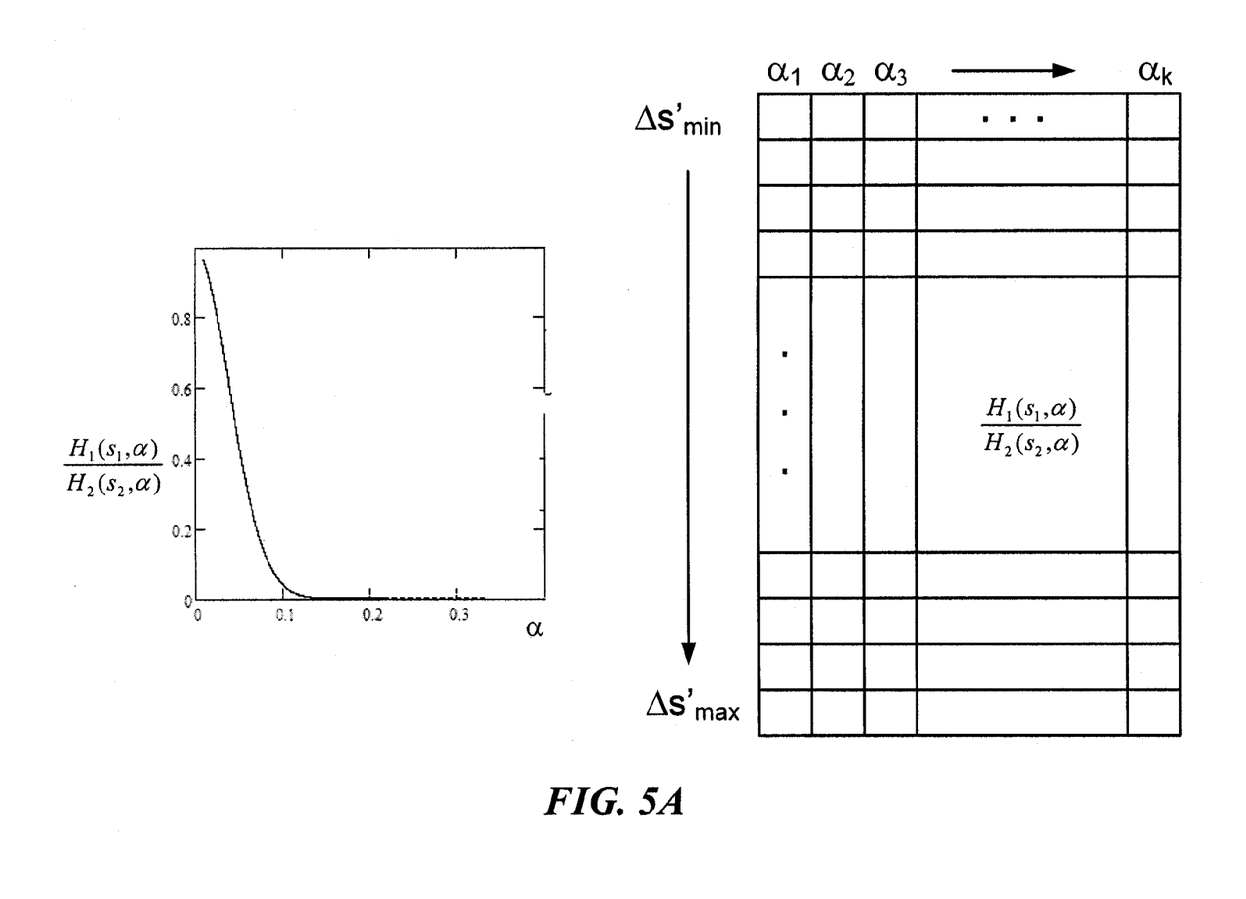
FIGS. 5A-5C show example look-up tables that can be used to autofocus an optical system.

An autofocus system may employ the above equations, but such equations could consume significant processing cycles, even if alternatives are employed, such as fast Fourier transforms. As an alternative, the system may employ one or more look-up tables to speed processing. A look-up table, such as the table shown in FIG. 5A, can be used for autofocusing an optical system. A graph of an example quotient of two image spectra $$G^r = \frac{G_1(s_1, \alpha)}{G_2(s_2, \alpha)} = \frac{H_1(s_1, \alpha)}{H_2(s_1, \alpha)}$$

is shown on the left side of FIG. 5A, where $G_1(s,\alpha)$ is the Fourier transform of a test image taken at a first location a distance $s_1$ from the second principal plane p2, $G_2(s,\alpha)$ is the Fourier transform of the test image taken at a second location a distance $s_2$ from the second principal plane p2, and $\alpha$ is the radial spatial frequency given by $\sqrt{(n^2+m^2)}$.

To find the best location for the image plane, the two-dimensional look-up table shown on the right side of FIG. 5A can be used. The radial spatial frequencies $\alpha$ are shown across the top of the table, and $\Delta s'$, the distance that the imager should be moved relative to the location of the imager that produced the image whose transform is $G_1$, is shown along the side of the table. Then the value of the quotient of the spectra $H_1/H_2$ is matched to the closest value of the quotient in the look-up table, where a least-squares method can be used to find the best match, for example.

Figure 5B:
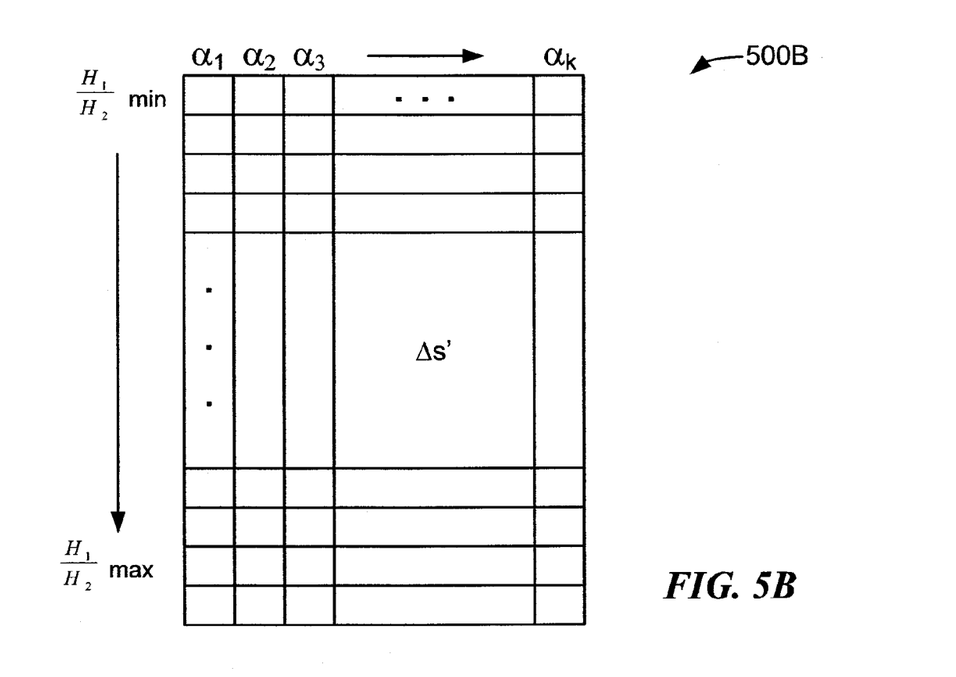

Alternatively, the value of the quotient of the spectra $H_1/H_2$ can be used to address the look-up table in order to reduce the number of times the look-up table is accessed to the number of increments of $\alpha$ for which the quotient $H_1/H_2$ is above a given noise floor. Thus, the look-up table 500B shown in FIG. 5B can be used. The radial spatial frequencies $\alpha$ are shown across the top of the table, while the quotient $H_1/H_2$ is shown along the side of the table, and the table is populated with values for $\Delta s'$.

Figure 5C:
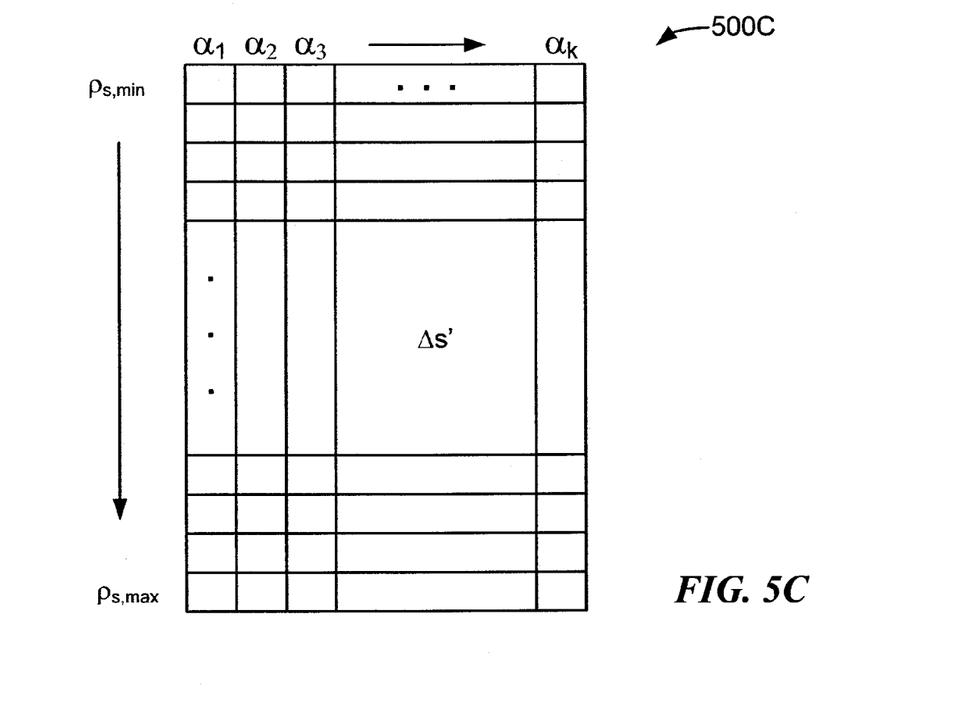

Furthermore, instead of using the quotient of the spectra $H_1/H_2$, it might be more practical to employ a result of a continuous monotonic transformation $$\rho_s = f\left(\frac{H_1(s_1, \alpha)}{H_2(s_s, \alpha)}\right) = f(s_1, s_2, \alpha),$$

see the look-up table 500C shown in FIG. 5C, where $$\frac{\partial}{\partial s_1}f(s_1, s_2, \alpha) > 0, \frac{\partial}{\partial s_2}f(s_1, s_2, \alpha) > 0, \forall\, s_1, s_2 \in [s_{min}, s_{max}], \alpha > 0.$$

As an example of such a transformation one can choose $f(x, y, a, b, c) = \exp(ax+by+c)$. The usage of such a transformation may provide a more compact and efficient representation of a look-up table, specifically when the imaging system employs non-linear optics.

Figure 6A:
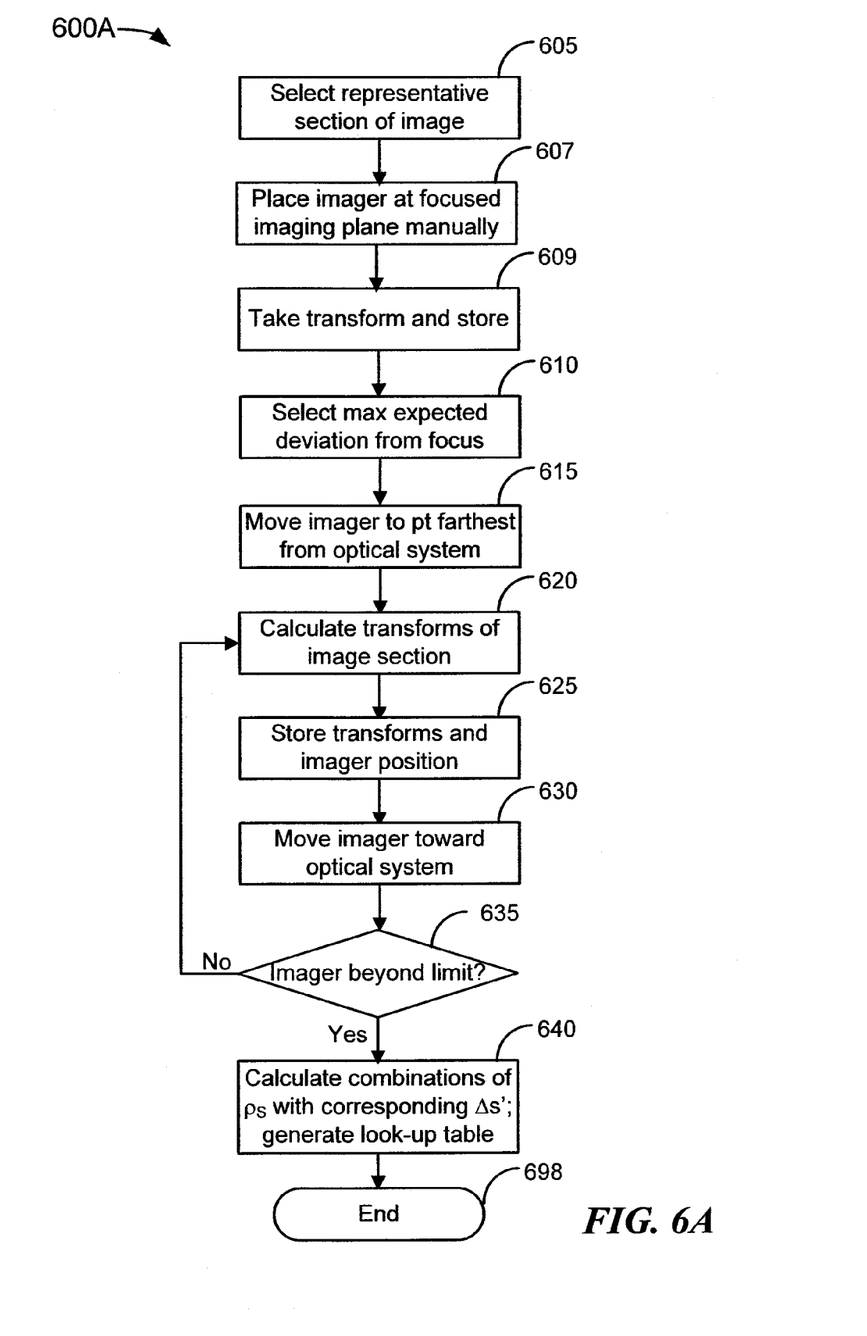
FIG. 6A depicts a flow diagram illustrating a suitable process for generating a look-up table for use in autofocusing an optical system.

FIG. 6A depicts a flow diagram illustrating a suitable process 600A for calibrating the optical system to generate a look-up table, such as table 500C, for use in autofocusing the system. At block 605, a section of the image is selected that includes representative frequencies of the image. Any representative section of the image may be used. In one example, the entire image can be selected to be transformed. Alternatively a portion of the image, similar to one shown in FIG. 3A, 3B or 3C may be used, with suitable machine readable symbols or bar codes being within the image.

At block 607 the optical system is focused by moving the imaging plane manually to the best focus position. Then a transform is taken of the image at the focused imaging plane position and stored at block 609 along with the position of the imager.

The maximum expected deviation from the focused imaging position is selected, in both directions, at block 610. The maximum expected deviation toward the optical system may or may not be the same as the maximum expected deviation away from the optical system. The maximum expected deviation is used for generating the limits of the look-up table, but the imager can be moved beyond the maximum expected deviation.

At block 615, the imager is moved by the system to the maximum expected deviation away from the optical system. The distance of this location from the position of the focused imaging plane is stored.

The Fourier transforms of the appropriately selected section of the image is taken at block 620. The variables, n and m, in the frequency domain of the transforms can be expressed as a single variable $\alpha=\sqrt{(n^2+m^2)}$. Then at block 625, the resulting transforms for various values of $\alpha$ are stored along with the position of the imager.

At block 630, the imager is moved a fixed distance toward the optical system. The distance that the imager is moved should be small enough such that sufficient data points are obtained for the look-up table, yet great enough to avoid too many values in the table or values that are too similar (depending upon the selected level of accuracy needed for the application in which the autofocus system will be used).

Next, at decision block 635, the system decides if the imager has been moved beyond the maximum expected deviation toward the optical system. If the imager has not moved beyond this limit (block 635—No), the process returns to block 620 to calculate the transforms at the next position. If the imager has moved beyond the limit (block 635—Yes), at block 640 the values of $\rho_s$ are calculated from the known transforms and imager positions stored previously. The corresponding distance that the imager must be moved relative to the position of the imager used to calculate the transform that gave rise to $\sigma_1$ is obtained by using the known distance that the imager was moved relative to the focused image position determined at block 607. This distance is stored in the generated look-up table to produce the table 500C.

The process ends at block 698. At this point the look-up table values have been generated for the optical system and stored for use in autofocusing the system.

Figure 6B:
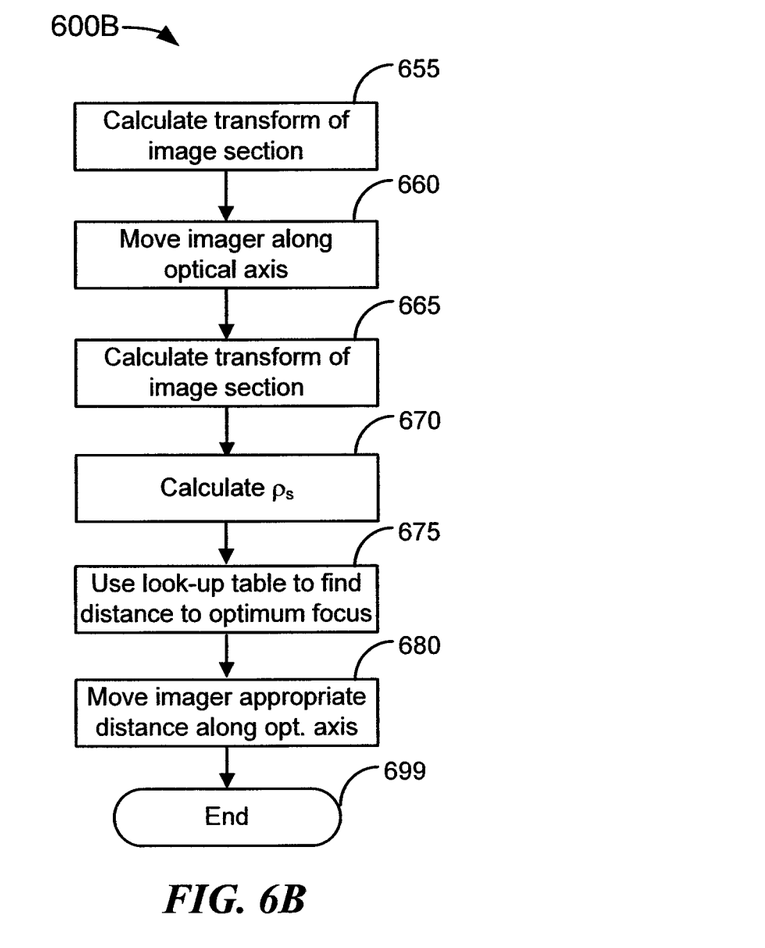
FIG. 6B depicts a flow diagram illustrating a suitable process for autofocusing an optical system using a look-up table.

FIG. 6B depicts a flow diagram illustrating a suitable process 600B for autofocusing an optical system using a look-up table. At block 655, the optical system is ready to be autofocused, and the system calculates the transform $G_1$ of the appropriate portion of the image for any position of the imager. The transform $G_1$ is stored.

At block 660, the imager is moved a known distance $\Delta s$ along the optical axis. The transform $G_2$ at this new position is calculated for the same portion of the image as in block 655 and stored.

Next, at block 670, $\rho_s$ is calculated, dividing the first transform $G_1$ obtained at block 655 by the second transform $G_2$ obtained at block 665, and applying a continuous monotonic transformation.

Then at block 675, a previously generated look-up table such as one obtained by using process 600A is used to look-up the closest value for $\rho_s$ to obtain the distance and direction to move the imaging plane to focus the image. Extrapolation techniques can be used if the value for $\rho_s$ calculated at block 670 is outside the values in the look-up table, and interpolation techniques can be used if the gradient value calculated at block 670 is between values in the look-up table The imager is moved the appropriate distance to focus the image at block 680, and the process ends at block 699 with an autofocused system.

Figure 7A:
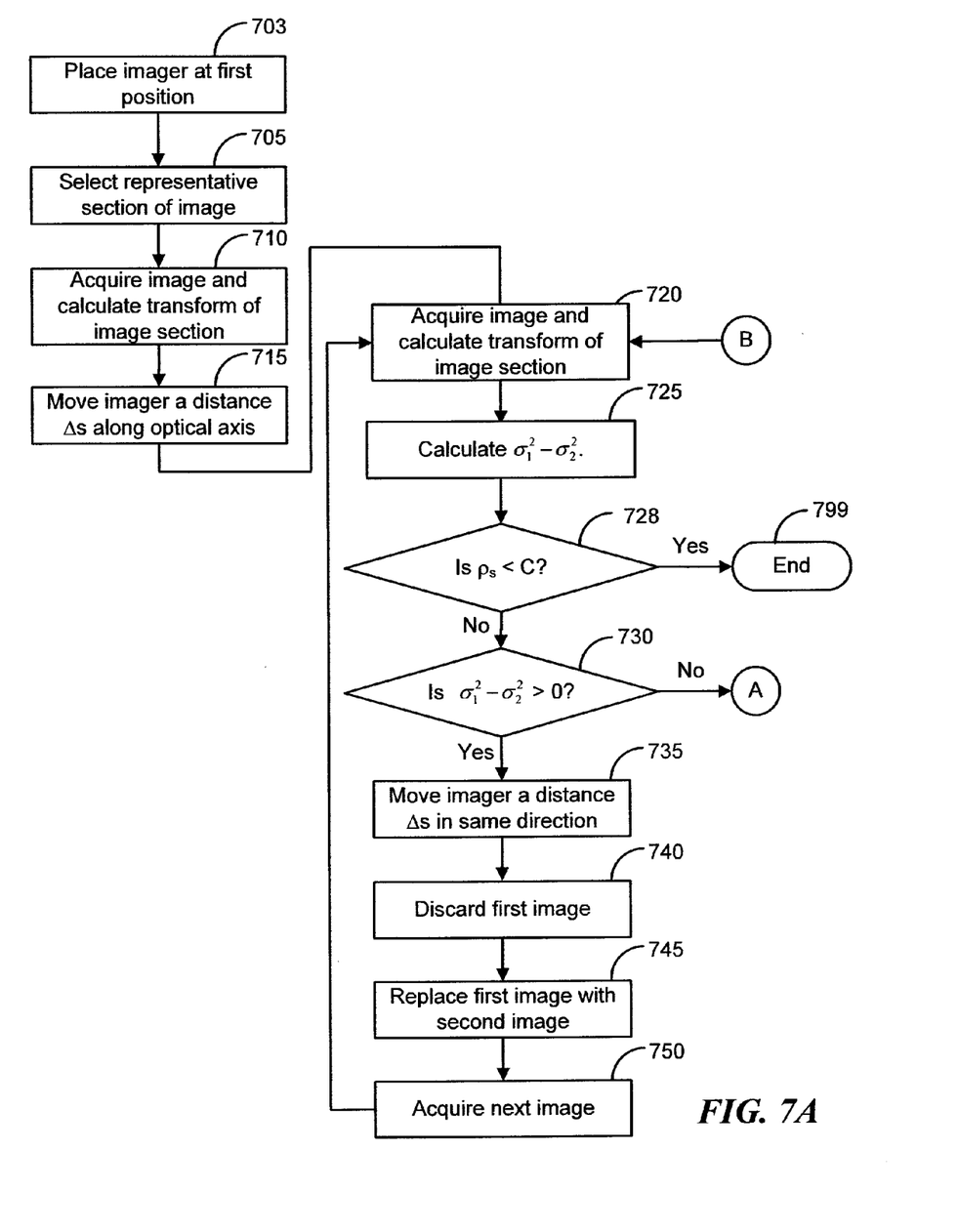
FIGS. 7A-7B depict flow diagrams illustrating a process for autofocusing an optical system.
Figure 7B:
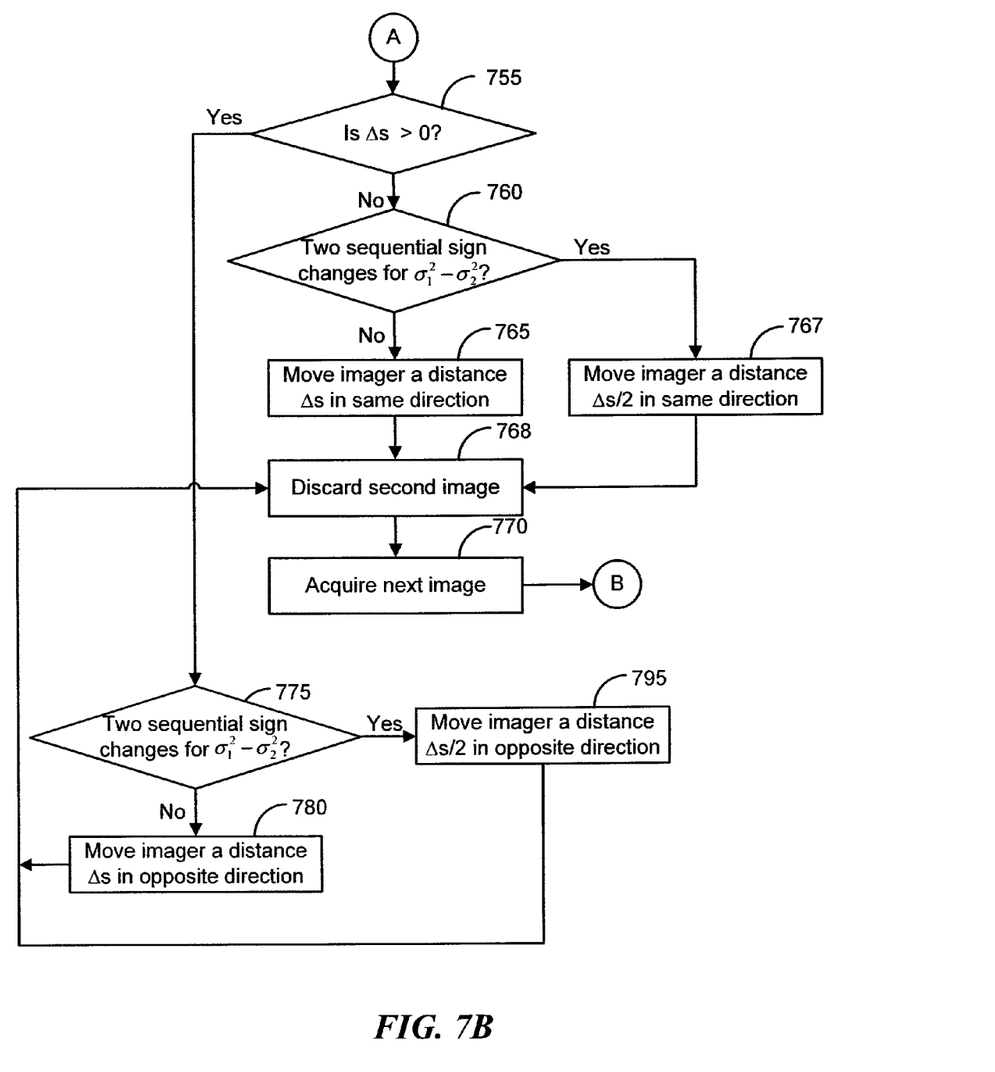

FIGS. 7A and 7B depict a flow diagram illustrating an alternative process for autofocusing an optical system. With this process, the system does not need to be pre-calibrated to generate a look-up table.

The autofocusing process starts at block 703 where the imager is placed at a first position relative to the optical system. The distance between the plane of the imager and the second principal plane p2 is called $s_1$. Then at block 705, a section of the image is selected that contains representative spatial frequencies of the image. Any representative section of the image can be used, such as the entire image.

A first image is acquired and the transform, $G_1$, of the selected section of the image is calculated at block 710. Any transform can be used that transforms the information in the image to spatial frequency information, such as a Fourier or Laplace transform. The resulting transform is stored for later use.

At block 715, the imager is moved a distance $\Delta s$ along the optical axis, such that the distance between the plane of the imager and the second principal plane p2 is now $s_2$, and $\Delta s=s_1-s_2$. The imager can be moved either towards or away from the optical system. The system acquires a second image and calculates the transform, $G_2$, of the second image obtained at the new imaging plane position at block 720 and stores the transform. Using the transform $G_2$ calculated at block 720 and the transform $G_1$ previously calculated, at block 725 the system calculates the difference of squared blur spread values, $\sigma_1^2-\sigma_2^2$, using equation (12).

At decision block 728, the system uses equation (14) to determine if the value of $\rho_s$ is less than a fixed value C. The value C should correspond to the case where the iteration has converged to an image deemed ideal, such that $$G^r = \frac{G_1(n, m)}{G_2(n, m)} \approx G_1(n, m) = \exp((n^2 + m^2)(\sigma_1^2)/2).$$

If the value of $\rho_s$ has converged to a value less than C (block 728—Yes), the process ends at block 799.

Figure 8:
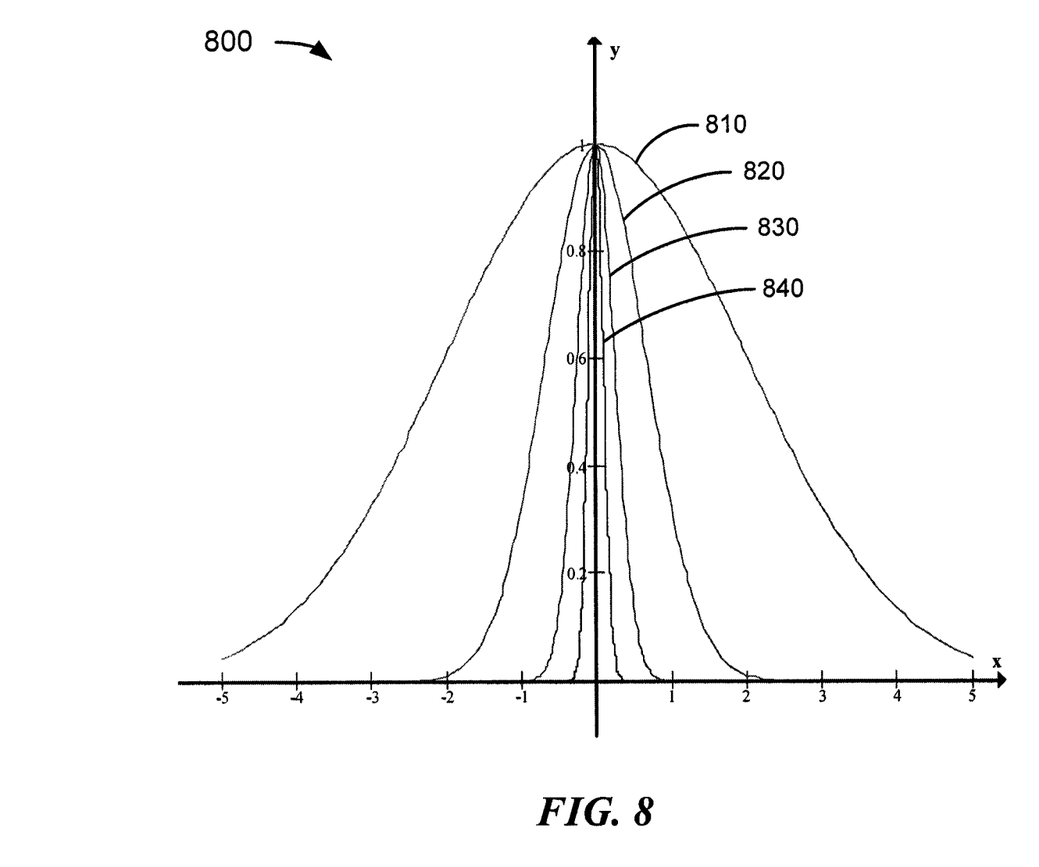
FIG. 8 shows an example of one dimensional convergence of the diameter of a blur circle.

For the one-dimensional case, the convergence of a diameter of the blur circle to a dot can be depicted as a convergence of normalized variation functions of equation (3) for images $g_1(x,y)$ 810, $g_2(x,y)$ 820, and subsequent images 830, 840, etc. to a unit function $\delta(0)$, as shown in FIG. 8.

If the value of $\rho_s$ has not converged to a value less than C (block 728—No), at decision block 730, the system determines if the value of $\sigma_1^2-\sigma_2^2$ is greater than zero. If the value of $\sigma_1^2-\sigma_2^2$ is greater than zero (block 730—Yes) at block 735, the imager is moved a distance $\Delta s$ in the same direction. The same process occurs for $\Delta s>0$ and $\Delta s<0$ when $\sigma_1^2-\sigma_2^2>0$. Thus, if the imager was moved away from the optical system the last time it was moved, then the imager is moved a distance $\Delta s$ away from the optical system at block 735. Likewise, if the imager moved toward the optical system the last time it was moved, then the imager is moved a distance $\Delta s$ toward the optical system at block 735.

Then at block 740, the first image, transform, and distance $s_1$ obtained during the present iteration are discarded, and at block 745, the second image and the corresponding information about the second image such as the transform and distance of the imager from the second principal plane obtained in the last iteration replace those of the first image. Thus, $G_2$ becomes the new $G_1$ and $s_2$ becomes the new $s_1$ for the next iteration.

At block 750, a new image is acquired at the new location of the imager, and this image is considered the new second image. Then the process continues at block 720, as described above.

Continuing the analysis from decision block 730, if the value of $\sigma_1^2-\sigma_2^2$ is less than zero (block 730—No), at decision block 755, the system determines if $\Delta s$ is greater than zero. If $\Delta s$ is greater than zero (block 755—Yes), at decision block 775, the system determines if there have been two sequential sign changes for $\sigma_1^2-\sigma_2^2$ over the last two iterations. If there have been two sequential sign changes (block 775—Yes), at block 795 the imager is moved a distance $\Delta s/2$ in the opposite direction from the direction the imager was moved during the last iteration. Then at block 768, the second image and related information are discarded, and at block 770 a new image is acquired which is considered the new second image. The process continues at block 720, as described above.

If there have not been two sequential sign changes (block 775—No), at block 780, the imager is moved a distance $\Delta s$ in the opposite direction from the direction the imager was moved during the last iteration. The process continues at block 768, as described above.

Continuing the analysis from decision block 755, if $\Delta s$ is less than zero (block 755—No), at decision block 760, the system determines if there have been two sequential sign changes for $\sigma_1^2-\sigma_2^2$ on the last two iterations. If there have been two sequential sign changes (block 760—Yes), at block 767 the imager is moved a distance $\Delta s/2$ in the same direction that the imager was moved during the last iteration, and the process continues at block 768, as described above. If there have not been two sequential sign changes (block 760—No), at block 765 the imager is moved a distance $\Delta s$ in the same direction that the imager was moved during the last iteration, and the process continues at block 768, as described above.

Figure 9:
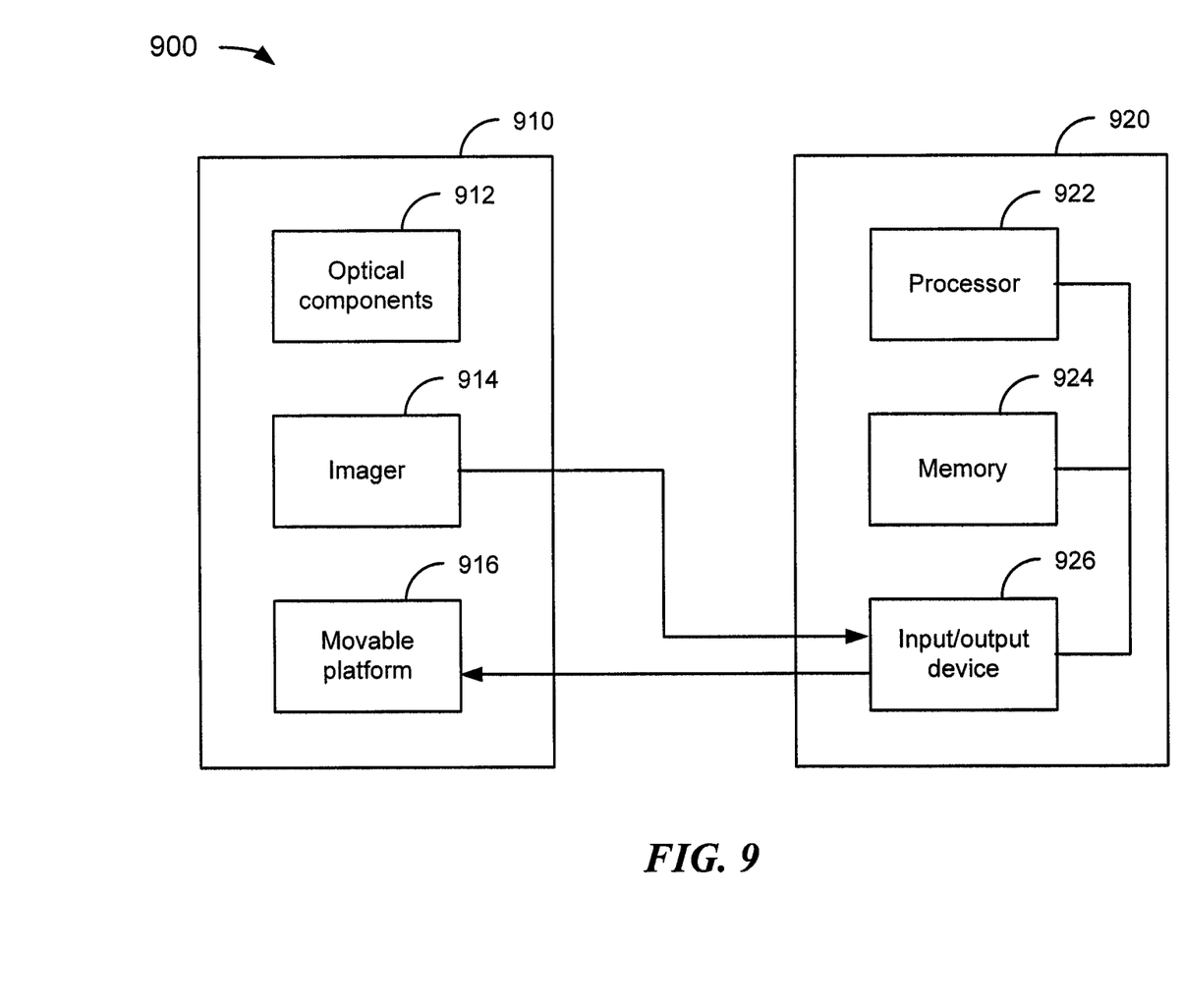
FIG. 9 shows an example block diagram of an optical system with an imager that can be moved to autofocus the system.

FIG. 9 shows an example block diagram 900 of an optical system 910 to be focused with a movable imager, where the movements of the imager are controlled by an autofocusing system 920.

The optical system 910 includes optical components 912 and an imager 914 that are moved relative to each other via a movable platform 916. The optical components 912 can be any optical system with any number of lenses and/or other optics in any configuration. The imager 914 is a detector that can receive and capture an image of an object imaged through the optical components 912 at an imaging plane. In one example, the movable platform 916 is a translation stage with a stepper motor or a translation stage with a direct current motor with an encoder. Other embodiments of a movable platform can also be used. The movable platform 916 is controlled by the autofocusing system 920. Pixel values of images taken by the imager 914 are sent to the input/output device 926 in the autofocusing system 920.

The autofocusing system 920 includes one or more processors 922, memory 924, and input/output devices 926. The one or more processors 922 can be a microprocessor or any other type of processor used to calculate transforms and blur spread values to determine movements of the imager 914 on the movable platform 916 in order to autofocus the optical system 910. Memory 924 can include, but is not limited to, RAM, ROM, and any combination of volatile and non-volatile memory. Memory can be used to store transform values, distances the platform has been moved, and look-up tables. An input/output device 926 can include, but is not limited to, visual displays, speakers, and communication devices such as receivers and/or transmitters that operate through wired or wireless communications. The input/output device 926 receives image data from the imager 914, and results from the processors 922 regarding the direction to move the imager 914 are sent to the movable platform 916. In one embodiment, the imager 914 can take further images at subsequent positions and send the image data to the input/output device 926.

Overall, the system 900 of FIG. 9 may take many forms, only one example of which is shown and described herein. For example, aspects of the invention include a computer-implemented method of autofocusing an optical system, comprising: applying a transform to a first image formed by the optical system and captured by an imager, wherein the first image is formed at a first position relative to the optical system; applying the transform to a second image formed by the optical system and captured by the imager, wherein the second image is formed at a second position relative to the optical system; determining a difference of squared blur spread values from the transformed first image and the transformed second image; and means for autofocusing the optical system based on the difference of squared blur spread values.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while lenses for eyeglasses are mentioned, any type of lens may be processed under the principles disclosed herein. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. An apparatus for autofocusing an optical system, comprising:
    a detector configured to capture images formed by the optical system;
    an actuator configured to move the detector and optical system relative to each other; and
    a processor for directing movement of the actuator based at least upon calculating a transform and a blur spread parameter of the images at a first position and a second position relative to the optical system,
    wherein the actuator comprises a movable platform configured to support the detector, wherein the platform is movable along an optical axis of the optical system, and wherein the processor calculates the transforms and the blur spread parameters based only on a predetermined subsection of the images.

2. The apparatus of claim 1 wherein the blur spread parameter is given by 0.44 $\lambda/D$, and $\lambda$ is a wavelength of light used by the optical system to form the image, and D is a diameter of a lens aperture of the optical system.

3. The apparatus of claim 1 wherein the transform is a Fourier transform, a Laplace transform, or a wavelet transform.

4. An apparatus for autofocusing an optical system, comprising:
    a detector configured to capture images formed by the optical system;
    an actuator configured to move the detector and optical system relative to each other; and
    a processor for directing movement of the actuator based at least upon calculating a transform and a blur spread parameter of the images at a first position and a second position relative to the optical system,
    a memory,
    wherein the memory stores a lookup table of ratios of transforms of a test image indexed by radial spatial frequency and positions of the optical system relative to the detector.

5. An apparatus for autofocusing an optical system, comprising:
    a detector configured to capture images formed by the optical system;
    an actuator configured to move the detector and optical system relative to each other;
    a processor for directing movement of the actuator based at least upon calculating a transform and a blur spread parameter of the images at a first position and a second position relative to the optical system; and
    a memory,
    wherein the memory stores a lookup table of move distances for the detector indexed by radial spatial frequency and ratios of transforms of a test image.

6. An apparatus for autofocusing an optical system, comprising:
    a detector configured to capture images formed by the optical system;
    an actuator configured to move the detector and optical system relative to each other;
    a processor for directing movement of the actuator based at least upon calculating a transform and a blur spread parameter of the images at a first position and a second position relative to the optical system; and
    a memory,
    wherein the memory stores a lookup table of move distances for the detector indexed by radial spatial frequency and a continuous monotonic transformation of ratios of transforms of a test image.

7. A computer-implemented method of autofocusing an optical system, comprising:
    applying a spectral transform to a first image formed by the optical system and captured by an imager, wherein the first image is formed at a first position relative to the optical system;

applying the spectral transform to a second image formed by the optical system and captured by the imager, wherein the second image is formed at a second position relative to the optical system;

determining a difference of squared blur spread values from the transformed first image and the transformed second image; and autofocusing the optical system based on the difference of squared blur spread values.

8. The method of claim 7 wherein the spectral transform is applied to only a predetermined subsection of the first image and the second image.

9. The method of claim 7 wherein autofocusing the optical system based on the difference of the squared blur spread values comprises:

calculating a first quotient, wherein the first quotient is given by the spectral transform of the first image divided by the spectral transform of the second image;

accessing a lookup table, wherein the lookup table stores pre-determined quotients of spectral transforms, and the pre-determined quotients are indexed by radial spatial frequency and a move distance that the imager should be moved;

matching the first quotient to a closest pre-determined quotient in the lookup table to determine a distance to move the imager; and moving the imager the determined distance.

10. The method of claim 7 wherein autofocusing the optical system based on the difference of the squared blur spread values comprises:

calculating a first quotient, wherein the first quotient is given by the spectral transform of the first image divided by the spectral transform of the second image;

accessing a lookup table, wherein the lookup table stores move distances that the imager should be moved, and the move distances are indexed by radial spatial frequency and pre-determined quotients of spectral transforms;

matching the first quotient to a closest pre-determined quotient in the lookup table to determine a distance to move the imager; and moving the imager the determined distance.

11. The method of claim 7 wherein autofocusing the optical system based on the difference of the squared blur spread values comprises:

calculating a first quotient, wherein the first quotient is given by the spectral transform of the first image divided by the spectral transform of the second image;

calculating a first parameter, wherein the first parameter applies a continuous monotonic function to the first quotient;

accessing a lookup table, wherein the lookup table stores move distances that the imager should be moved, and the move distances are indexed by radial spatial frequency and pre-determined parameters obtained by applying the continuous monotonic function to quotients of spectral transforms;

matching the first parameter to a closest pre-determined parameter in the lookup table to determine a distance to move the imager; and moving the imager the determined distance.

12. A computer-readable medium storing instructions for autofocusing an optical system, wherein the instructions comprise:

applying a transform to a first image formed by the optical system and captured by a detector, wherein the first image is formed at a first location relative to the optical system;

applying the transform to a second image formed by the optical system and captured by the detector, wherein the second image is formed at a second location relative to the optical system;

determining a difference of squared blur spread values from the transformed first image and the transformed second image; and autofocusing the optical system based on a mathematical function between the squared blur spread values.

13. The method of claim 12 wherein autofocusing the optical system based on the difference of the squared blur spread values comprises:

calculating a first quotient, wherein the first quotient is given by the transform of the first image divided by the transform of the second image;

accessing a lookup table, wherein the lookup table stores pre-determined quotients of transforms, and the pre-determined quotients are indexed by radial spatial frequency and a move distance that the detector should be moved;

matching the first quotient to a closest pre-determined quotient in the lookup table to determine a distance to move the detector; and moving the detector the determined distance.

14. The method of claim 12 wherein autofocusing the optical system based on the difference of the squared blur spread values comprises:

calculating a first quotient, wherein the first quotient is given by the transform of the first image divided by the transform of the second image;

accessing a lookup table, wherein the lookup table stores move distances that the detector should be moved, and the move distances are indexed by radial spatial frequency and pre-determined quotients of transforms;

matching the first quotient to a closest pre-determined quotient in the lookup table to determine a distance to move the detector; and moving the detector the determined distance.

15. The method of claim 12 wherein autofocusing the optical system based on the difference of the squared blur spread values comprises:

calculating a first quotient, wherein the first quotient is given by the transform of the first image divided by the transform of the second image;

calculating a first parameter, wherein the first parameter applies a continuous monotonic function to the first quotient;

accessing a lookup table, wherein the lookup table stores move distances that the detector should be moved, and the move distances are indexed by radial spatial frequency and pre-determined parameters obtained by applying the continuous monotonic function to quotients of transforms;

matching the first parameter to a closest pre-determined parameter in the lookup table to determine a distance to move the detector; and moving the detector the determined distance.

16. The method of claim 12 wherein the transform is applied to only a predetermined subsection of the first image and the second image.

17. The method of claim 16, wherein the transform is calculated for only a predetermined section of each image.

18. A method of autofocusing an optical system, comprising:

positioning a detector at a first position along an optical axis of the optical system;

calculating a transform of a first image formed by the optical system at the first position;

moving the detector along the optical axis of the optical system to a second position;

calculating a transform of a second image formed by the optical system at the second position;

calculating from the transform of the first image and the transform of the second image, a first parameter and a second parameter, wherein the first parameter is given by $(\sigma_1^2-\sigma_2^2)$, wherein $\sigma_1$ is a first blur spread value for the first image, and $\sigma_2$ is a second blur spread value for the second image, and a second parameter is given by the first parameter divided by $\Delta s$, wherein $\Delta s$ is given by a difference between the first position and the second position;

based upon signs of the first parameter and the second parameter, determining how far and in which direction to move the detector along the optical axis and moving the detector accordingly to a third position; and if the second parameter has converged to a predetermined value, stop moving the detector, otherwise based upon signs of the first parameter and the second parameter, determining whether to discard the first image or the second image;

calculating a transform of a third image formed by the optical system at the third position, wherein the third image replaces the discarded image;

calculating from the transform of the third image and the undiscarded transform, a new first parameter and a new second parameter; and based upon signs of the new first parameter and the new second parameter, determining how far and in which direction to move the detector along the optical axis and moving the detector accordingly to a new position.

* * * * *